(12) United States Patent
Kimura

(10) Patent No.: US 11,669,727 B2
(45) Date of Patent: Jun. 6, 2023

(54) INFORMATION PROCESSING DEVICE, NEURAL NETWORK DESIGN METHOD, AND RECORDING MEDIUM

(71) Applicant: NEC CORPORATION, Tokyo (JP)

(72) Inventor: Daichi Kimura, Tokyo (JP)

(73) Assignee: NEC CORPORATION, Tokyo (JP)

(*) Notice: Subject to any disclaimer, the term of this patent is extended or adjusted under 35 U.S.C. 154(b) by 998 days.

(21) Appl. No.: 16/477,728

(22) PCT Filed: Jan. 17, 2018

(86) PCT No.: PCT/JP2018/001149
§ 371 (c)(1),
(2) Date: Jul. 12, 2019

(87) PCT Pub. No.: WO2018/135515
PCT Pub. Date: Jul. 26, 2018

(65) Prior Publication Data
US 2019/0362240 A1 Nov. 28, 2019

(30) Foreign Application Priority Data
Jan. 23, 2017 (JP) .............. JP2017-009730

(51) Int. Cl.
*G06N 3/10* (2006.01)
*G06N 3/08* (2023.01)
(52) U.S. Cl.
CPC .............. *G06N 3/08* (2013.01); *G06N 3/105* (2013.01)

(58) Field of Classification Search
None
See application file for complete search history.

(56) References Cited

FOREIGN PATENT DOCUMENTS

| JP | 2007-087125 A | 4/2007 |
|----|---------------|--------|
| WO | 2016/174725 A1 | 11/2016 |

OTHER PUBLICATIONS

Scarselli F, Gori M, Tsoi AC, Hagenbuchner M, Monfardini G. The graph neural network model. IEEE transactions on neural networks. Dec. 9, 2008;20(1):61-80. (Year: 2008).*
Gao X, Xiao B, Tao D, Li X. A survey of graph edit distance. Pattern Analysis and applications. Feb. 2010;13(1):113-29. (Year: 2010).*
Hamilton WL, Ying R, Leskovec J. Representation learning on graphs: Methods and applications. arXiv preprint arXiv:1709. 05584. Sep. 17, 2017. (Year: 2017).*

(Continued)

*Primary Examiner* — Vincent Gonzales
(74) *Attorney, Agent, or Firm* — Sughrue Mion, PLLC

(57) ABSTRACT

Provided are an information processing device and the like that facilitate designing a neural network capable of extracting higher-order features. An information processing device includes: an extraction unit that extracts a plurality of subgraphs from a graph including a plurality of nodes and a plurality of edges; a calculation unit that calculates a distance between the plurality of subgraphs extracted; and a design unit that designs a neural network, based on the distance calculated, in that at least a part of the graph is set to an input.

8 Claims, 7 Drawing Sheets

(56) References Cited

OTHER PUBLICATIONS

Mathias Niepert et al., "Learning Convolutional Neural Networks for Graphs", Proceedings of the 33rd International Conference on Machine Learning, [Online], Jun. 24, 2016 [Searched on: Mar. 1, 2018], Internet: <http://jmlr.org/proceedings/papers/v48/niepert16.pdf>, pp. 2014-2023.

Joan Bruna et al., "Spectral Networks and Deep Locally Connected Networks on Graphs", arXiv, [Online], May 21, 2014 [Searched on: Mar. 1, 2018], Internet: <http:/arxiv.org/pdf/1312.6203.pdf>, pp. 1-14.

International Search Report of PCT/JP2018/001149 dated Mar. 13, 2018 [PCT/ISA/210].

Written Opinion of PCT/JP2018/001149 dated Mar. 13, 2018 [PCT/ISA/237].

\* cited by examiner

INFORMATION PROCESSING DEVICE, NEURAL NETWORK DESIGN METHOD, AND RECORDING MEDIUM

CROSS REFERENCE TO RELATED APPLICATIONS

This application is a National Stage of International Application No. PCT/JP2018/001149, filed Jan. 17, 2018, claiming priority to Japanese Patent Application No. 2017-009730, filed Jan. 23, 2017, the contents of all of which are incorporated herein by reference in their entirety.

TECHNICAL FIELD

The present disclosure relates to an information processing device and the like.

BACKGROUND ART

There exist many objects of which structures can be expressed by a graph, such as a business model, a social network, and a chemical structure. PTL 1 discloses a technique of visualizing biological information such as a gene by a graph. NPL 1 also discloses a technique related to learning of a graphic structure using a neural network.

CITATION LIST

Patent Literature

[PTL 1] Japanese Unexamined Patent Application Publication No. 2007-087125

Non Patent Literature

[NPL 1] Mathias Niepert, Mohamed Ahmed, Konstantin Kutzkov "Learning Convolutional Neural Networks for Graphs", [online], June, 2016, Proceedings of The 33rd International Conference on Machine Learning, PMLR 48, Internet (URL: http://proceedings.mlr.press/v48/niepert16.pdf)

SUMMARY OF INVENTION

Technical Problem

In order to extract a high-order characteristic by a neural network, it is important to extract low-order characteristics and appropriately combine the low-order characteristics. In NPL 1, a method of extracting a plurality of subgraphs as a receptive field relative to a neural network from a graph becoming a learning object is disclosed. Although the extracted subgraphs can be assumed to be low-order characteristics, the low-order characteristics cannot be appropriately combined in the above-described method. Therefore, in the method disclosed in NPL 1, it is difficult to extract the high-order characteristic.

An exemplary object of the present disclosure is to provide a technique for facilitating designing of a neural network capable of extracting a high-order characteristic.

Solution to Problem

An information processing device according to an example aspect of the present disclosure, includes: extraction means for extracting a plurality of subgraphs from a graph including a plurality of nodes and a plurality of edges; calculation means for calculating a distance between the plurality of extracted subgraphs; and designing means for designing, based on the calculated distance, a neural network in that at least a part of the graph is set to an input.

A neural network design method according to another example aspect of the present disclosure, includes: extracting a plurality of subgraphs from a graph including a plurality of nodes and a plurality of edges; calculating a distance between the plurality of extracted subgraphs; and designing, based on the calculated distance, a neural network in that at least a part of the graph is set to an input.

A recording medium recording a program causing a computer according to yet another example aspect of the present invention to execute: a step of extracting a plurality of subgraphs from a graph including a plurality of nodes and a plurality of edges; processing of calculating a distance between the plurality of extracted subgraphs; and processing of designing, based on the calculated distance, a neural network in that at least a part of the graph is set to an input.

Note that a program according to yet another example aspect of the above-described present disclosure may be recorded in a recording medium. In this case, the object of the present disclosure is also achieved by the recording medium recording the above-described program.

Advantageous Effects of Invention

According to the present disclosure, designing of a neural network capable of extracting a high-order characteristic is facilitated.

EXAMPLE EMBODIMENTS

First Example Embodiment

Figure 1:
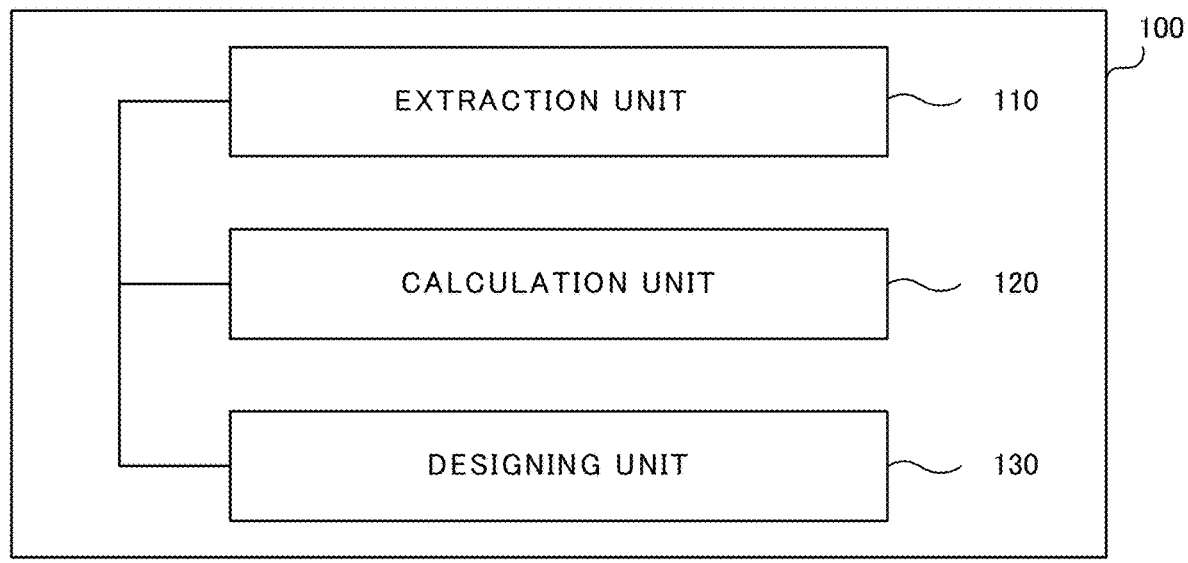
FIG. 1 is a block diagram illustrating one example of a configuration of an information processing device.

FIG. 1 is a block diagram illustrating a configuration of an information processing device 100 according to a first example embodiment. The information processing device 100 is a device for designing a neural network based on a graph. The information processing device 100 includes an extraction unit 110, a calculation unit 120, and a designing unit 130. The information processing device 100 may further include another configuration element.

The graph in the present disclosure includes a plurality of nodes and a plurality of edges (also referred to as links). A node represents a structural element, and an edge represents a connection relationship between nodes. For example, the graph according to the present disclosure is composed of data representing a plurality of nodes, and data representing whether a connection between nodes is present or absent (that is, edge). Hereinafter, these data representing the graph are also referred to as "graph data". In addition, a structure expressed by the graph according to the present disclosure is not limited to a specific object. Further, hereinafter, a total number of nodes included in a graph is also referred to as "the number of nodes".

A neural network in the present disclosures denotes an artificial neural network. Hereinafter, the neural network is occasionally abbreviated as "NN". The NN includes an input layer, one or a plurality of intermediate layers (also referred to as hidden layers), and an output layer. Each layer includes one or a plurality of neurons (also referred to as unit). In the present disclosure, a receptive field for neuron is related to a graph (or a node).

The extraction unit 110 extracts a subgraph from a graph. The subgraph mentioned herein denotes a graph composed of a part of nodes and edges configuring a graph, and is also referred to as a sub-graph. The extraction unit 110 extracts a plurality of subgraphs from one graph. The extraction unit 110 causes to temporarily store data representing the extracted subgraphs to a memory and the like. The data representing the subgraphs includes data representing nodes that configure subgraphs and data representing whether a connection between nodes is present or absent.

The extraction unit 110 may extract subgraphs in accordance with a predetermined rule. In some cases, the extraction unit 110 can extract subgraphs by ranking nodes, based on a well-known ranking algorithm. In more detail, the extraction unit 110 extracts, as subgraphs, graphs composed of nodes up to a predetermined rank and nodes having a predetermined connection relationship with the nodes. The ranking algorithm available for use in node ranking is, for example, an algorithm that impart sequential orders (ranks) to nodes, based on PageRank®, degree centrality, closeness centrality, betweenness centrality, or eigenvector centrality. Node ranking may be the same as the method described in NPL 1.

A total number of subgraphs extracted by the extraction unit 110 is not limited to a specific number. The number of nodes in the subgraphs is not limited to a specific number, either. These numbers may be predetermined at the time of designing a neural network. Alternatively, the extraction unit 110 may determine the number of subgraphs and the number of nodes, based on the number of nodes in a graph to be input or the like.

The calculation unit 120 calculates a distance between the subgraphs. The distance mentioned herein denotes an indicator indicating a relationship between two subgraphs. In some cases, the distance between subgraphs can be defined in the same manner as the distance between nodes (that is, the number of edges configuring the shortest route between two nodes). In this case, the distance between subgraphs are represented by the shortest distance (that is, the minimum value) among the distances between nodes configuring a subgraph and nodes configuring another subgraph.

Note that the distance between two subgraphs, when the two subgraphs include a common node, is shorter than that when they do not include the common node. Hereinafter, a connection relationship between two subgraphs including a common node is referred to as "adjacent". When two subgraphs are adjacent to each other, it is possible to include two cases, one of the cases is that two subgraphs share one node and the other case is that the subgraphs include two or more nodes.

Figure 2:
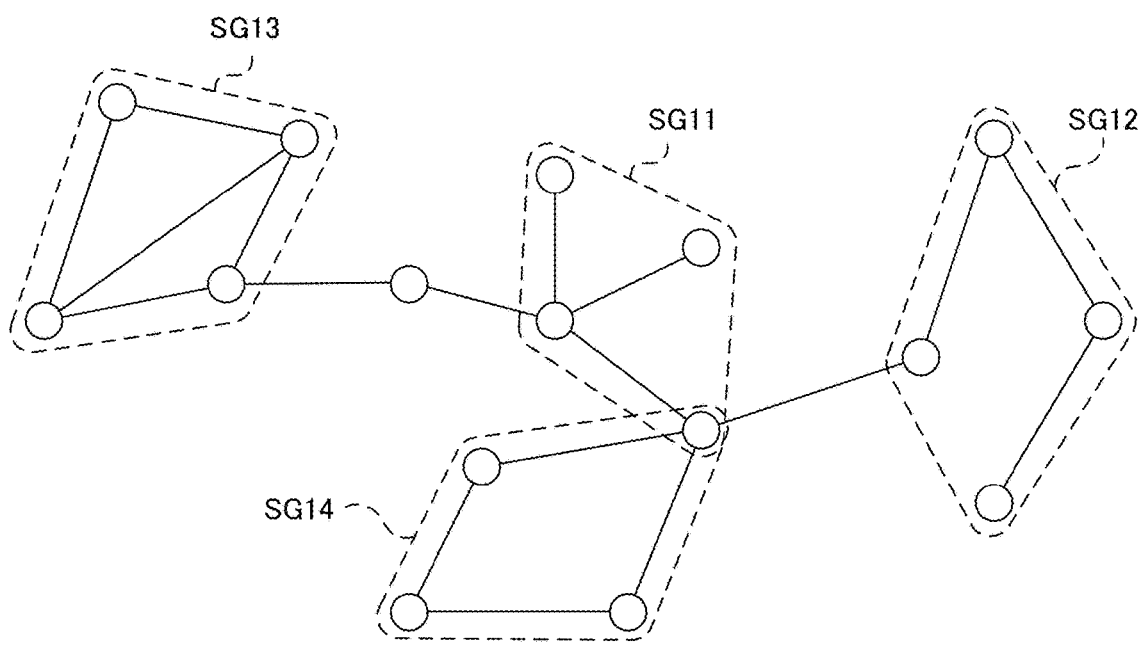
FIG. 2 is a diagram exemplifying a subgraph and a distance between subgraphs.

FIG. 2 is a diagram exemplifying the subgraph and the distance between subgraphs. For example, a distance between a subgraph SG11 and a subgraph SG12 is equivalent to one edge, and thus can be represented as "1". Therefore, a distance between the subgraph SG11 and a subgraph SG13 is equivalent to two edges, and thus can be represented as "2".

On the other hand, the subgraph SG11 and a subgraph SG14 are in an adjacent relationship. The subgraph SG14 is in a relationship close in terms of distance to the subgraph SG11 in comparison with the subgraphs SG12 and SG13. Therefore, a distance between the subgraph SG11 and the subgraph SG14 can be represented as a smaller value, for example "0", than the distance between the subgraph SG11 and the subgraph SG12.

Note that the distances described referred to FIG. 2 are merely exemplified. Any distance between subgraphs may be defined as long as it can be compared with a combination of other subgraphs. For example, the distances such that two subgraphs are adjacent to each other may be represented by a value other than "0", or may be different depending on the number of shared nodes.

Further, as another example, the calculation unit 120 may define a distance between two subgraphs by the number of connections made via adjacency to another subgraph. For example, when a first subgraph is adjacent to a second subgraph, the calculation unit 120 may define the distance to be "1". In addition, the calculation unit 120 may define, to be "2", a distance between the first subgraph and a third subgraph that is not adjacent to the first subgraph and is adjacent to the second subgraph, because these subgraphs are connected via two adjacencies.

The calculation unit 120 calculates distances for all of combinations (pairs) selected by the subgraphs extracted by the extraction unit 110. For example, when it is assumed that the subgraphs extracted by the extraction unit 110 are the subgraphs SG11 to SG14 of FIG. 2, the calculation unit 120 calculates the respective distances between SG11 and SG12, between SG11 and SG13, between SG11 and SG14, between SG12 and SG13, between SG12 and SG14, and between SG13 and SG14.

The designing unit 130 designs the NN based on the graph. In more detail, the designing unit 130 designs the NN that uses, as an input, at least a part of the graph represented by the input graph data. Specifically, the designing unit 130 designs the NN by setting, as an input of the NN, each node included in the subgraph extracted by the extraction unit 110, and determining binding between neurons based on the distance between subgraphs. Designing the NN by the designing unit 130 is also referred as to determine a binding relationship between neurons. Note that the NN designed by the designing unit 130 may have single or multiple intermediate layers.

Figure 3:
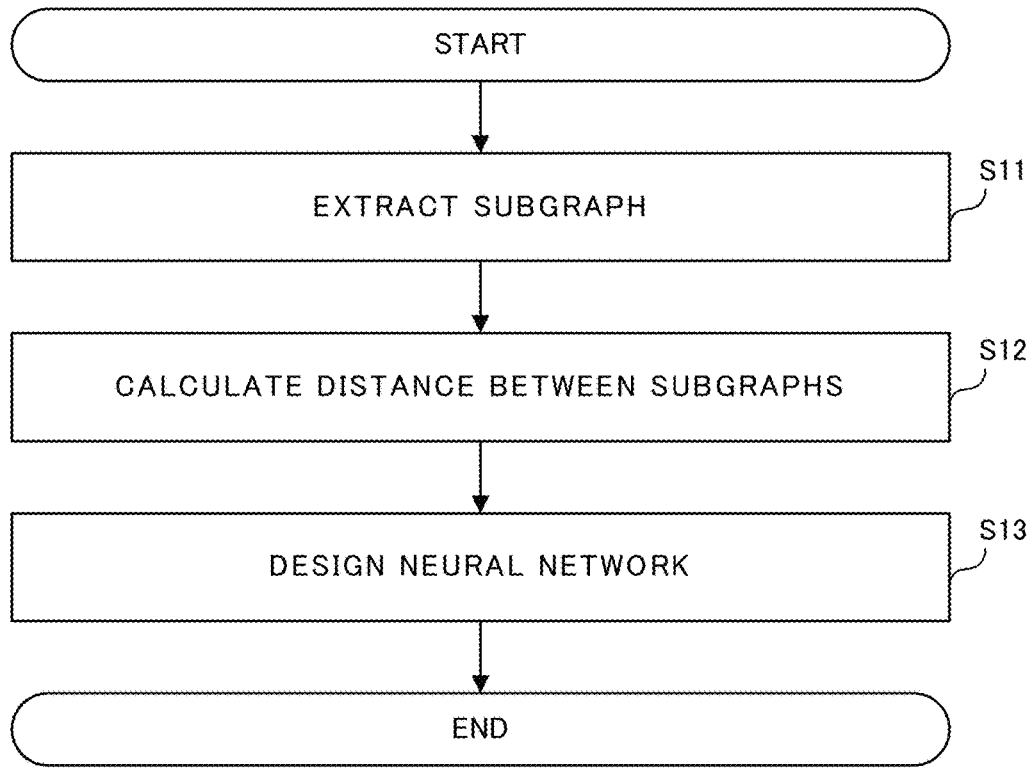
FIG. 3 is a flowchart illustrating one example of processing executed by the information processing device.

FIG. 3 is a flowchart illustrating processing executed by the information processing device 100. The information processing device 100 can start execution of this processing with a timing with which a graph is input, a timing instructed by a user, or the like. Note that, herein, it is assumed that the number of nodes in a graph is "n".

In step S11, the extraction unit 110 extracts a subgraph from a graph. In more detail, first, the extraction unit 110 selects w nodes from n nodes, based on a first rule. Note that w is a positive integer of n or less. Next, the extraction unit 110 selects, for a respective one of the selected w nodes, k-1 nodes configuring the subgraph with the node, based on a second rule. Note that k is equivalent to the number of nodes in the subgraph, and is a positive integer of n or less. The first rule and the second rule are predetermined ranking algorithms, for example. The first rule and the second rule may be the same or not. The first rule and the second rule may also be the same as the method described in NPL 1.

The extraction unit 110 extracts w subgraphs by selecting nodes in this manner. In this example, individual subgraphs are composed of anyone of w selected nodes and k-1 nodes selected for the node. However, the number of nodes in the individual subgraphs may not be constant. For example, the subgraphs extracted by the extraction unit 110 may include those in which the number of nodes is less than k.

In step S12, the calculation unit 120 calculates a distance between the subgraphs extracted in step S11. In this example, the calculation unit 120 calculates mutual distances between w subgraphs. That is, the calculation unit 120 respectively calculates, for the respective w subgraphs, distances from w-1 subgraphs other than the subgraph.

In step S13, the designing unit 130 designs the NN in that at least a part of the nodes included in a graph is set to an input. Specifically, the designing unit 130 determines a binding relationship between the neuron of a layer (first layer) and the neuron of a subsequent layer (second layer), based on the distance calculated in step S12. For example, when the subgraph extracted by the extraction unit 110 are set to be input to the neuron of the input layer (first layer), the designing unit 130 determines, based on the distance calculated in step S12, the neuron of the input layer that bind with the neurons of the intermediate layer (second layer).

In more detail, the designing unit 130 assumes, to be input to the neurons of the second layer, (output from neuron related to) the subgraph input to the first layer and (output from neuron related to) another subgraph of which distance from the subgraph is a predetermined threshold value or less.

Binding from the neuron of the first layer to the neuron of the second layer may be a predetermined number. In this case, the designing unit 130 sets, to be input to the neuron of the second layer, (output from neuron related to) a subgraph and (output from neurons related to) a predetermined number of other subgraphs of which distances from the subgraph are short.

As described above, the information processing device 100 of the present example embodiment has a configuration that calculates a distance between subgraphs, and then designs the NN based on the calculated distance. This configuration enables the neuron of a layer and the neuron of a subsequent layer to be selectively bound in the NN that employs subgraphs. In other words, this configuration enables to select information. The NN designed thus enables associativity or similarity between subgraphs to be propagated, therefore the NN can easily extract a high-order characteristic in comparison with a NN which is not so designed.

Further, the information processing device 100 of the present example embodiment can attain the following functions and advantageous effects in comparison with a case of defining the distance between subgraphs by using another standard (for example, the number of edges), by defining the distance between subgraphs based on an "adjacent" relationship referred to as in the present example embodiment.

Figure 4:
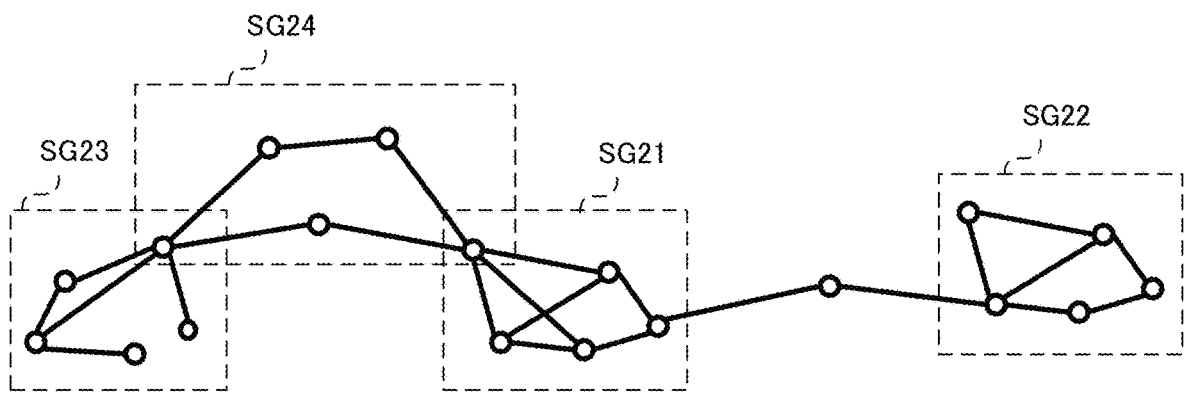
FIG. 4 is a diagram exemplifying a graphic structure.

FIG. 4 is a diagram exemplifying a graph structure. This graph structure includes four subgraphs SG21, SG22, SG23, and SG24. In this example, it is assumed that the distance between subgraphs is a minimum value of distances between a node configuring a subgraph and a node configuring another subgraph. For example, a distance between the subgraph SG21 and the subgraph SG22 is two edges, and thus is "2".

In the example of FIG. 4, both the distance between the subgraphs SG21 and SG22 and a distance between the subgraphs SG21 and SG23 are "2". However, the subgraph SG21 is adjacent to the subgraph SG24. The subgraph SG24 is also adjacent to the subgraph SG23.

In this case, the subgraph SG21 and the subgraph SG23 can be assumed to be associated with each other in some functions or characteristics via the subgraph SG24. Therefore, there is a high possibility that a combination between the subgraph SG21 and the subgraph SG23 has some associativity or similarity, in comparison with a combination between the subgraph SG21 and the subgraph SG22.

The information processing device 100 of the present example embodiment assumes such subgraphs in an adjacent relationship to be input to a common neuron, and thereby enables designing of the NN from which a high-order characteristic is more easily extracted in comparison with a case where they are not in such relationship (for example, a case of full binding). However, the fact that the subgraphs input to one neuron of the second layer is in an adjacent relationship, as described above, is not mandatory in the NN designed by the information processing device 100.

Second Example Embodiment

Figure 5:
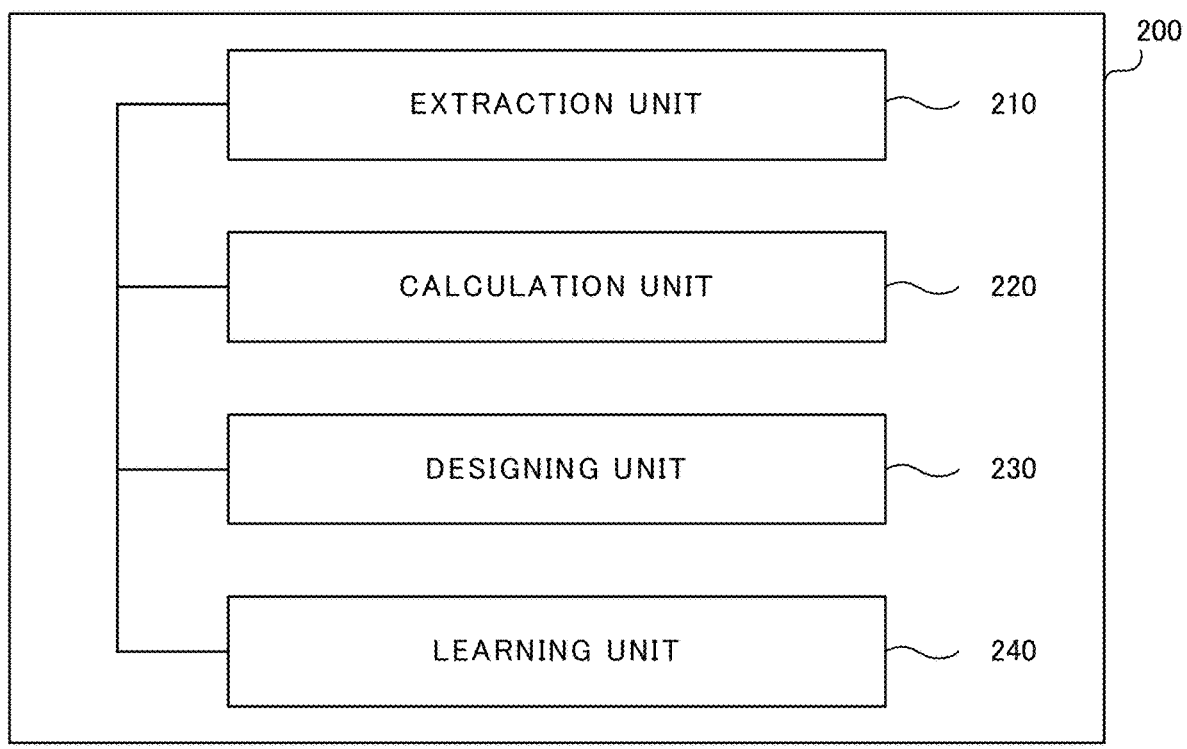
FIG. 5 is a block diagram illustrating one example of a configuration of a learning device.

FIG. 5 is a block diagram illustrating a configuration of a learning device 200 according to another example embodiment. The learning device 200 is a device for executing learning by using the NN. The learning device 200 includes an extraction unit 210, a calculation unit 220, a designing unit 230, and a learning unit 240. The learning device 200 is related to one example of the information processing device 100 of the first example embodiment.

The extraction unit 210, the calculation unit 220, and the designing unit 230 have the same functions as the extraction unit 110, the calculation unit 120, and the designing unit 130 of the information processing device 100. The extraction unit 210, the calculation unit 220, and the designing unit 230 also have a function of executing processing recursively, in addition to the functions described in the first example embodiment. The recursive processing mentioned herein denotes processing of executing the processing executed for a node, for a subgraph including the node (detailed description of which will be given later).

The learning unit 240 causes the NN designed by the designing unit 230 to perform learning. For example, the learning unit 240 inputs sample data for learning to the NN, and causes the NN to perform learning a characteristic included in the sample data. The sample data is, for example, data indicating a graph structure that is a correct answer or an incorrect answer relative to a criterion. A specific approach of learning by the learning unit 240 may be some well-known methods.

Figure 6:
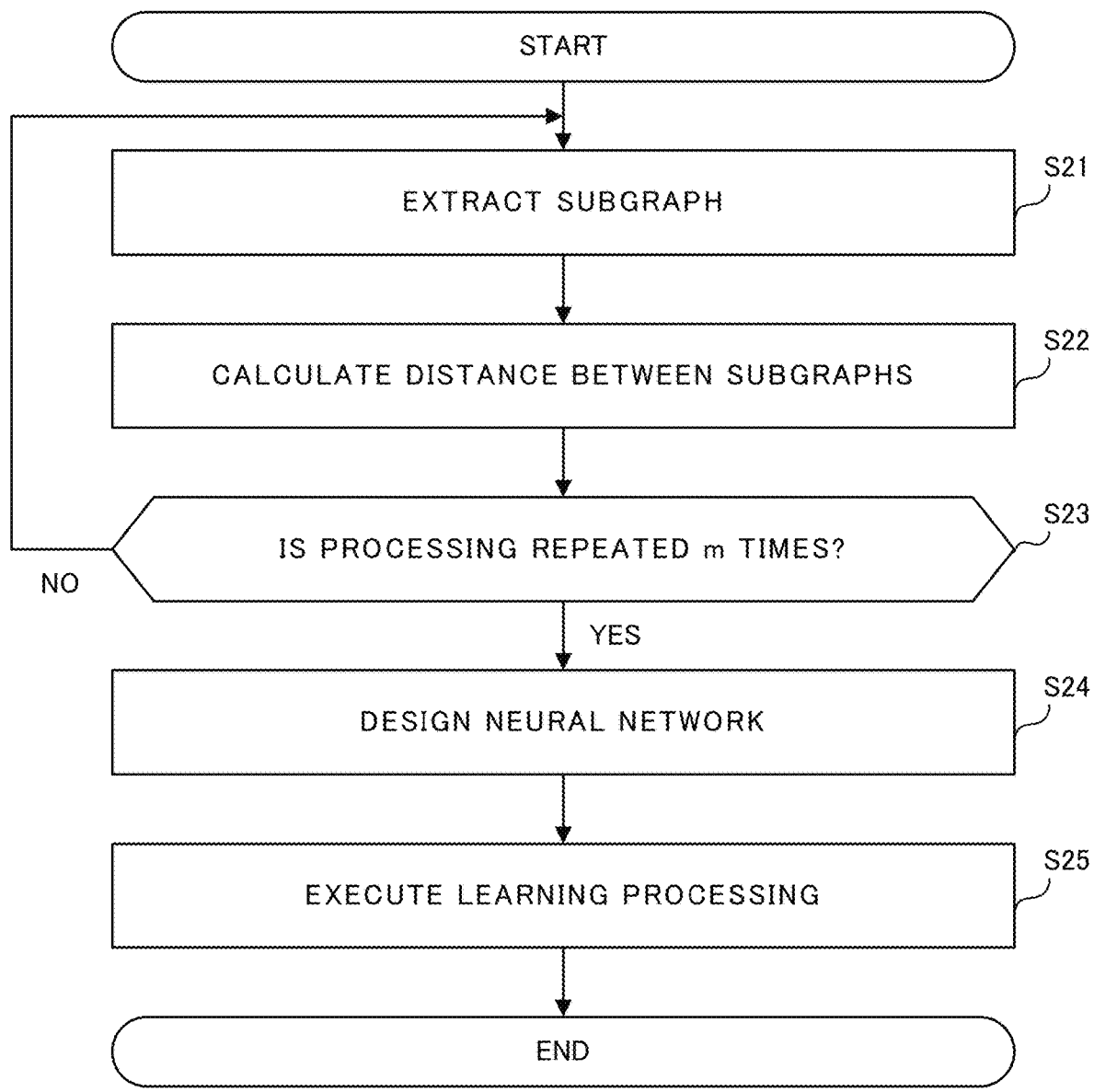
FIG. 6 is a flowchart illustrating one example of processing executed by the learning device.

FIG. 6 is a flowchart illustrating processing executed by the learning device 200. This flowchart illustrates a case where at least m intermediate layers of the NN are present. Note that m is an integer of 2 or more. In step S21, the extraction unit 210 extracts a subgraph from a graph. In step S22, the calculation unit 220 calculates a distance between the subgraphs extracted in step S21. The processing of steps S21 and S22 are the same as that of steps S11 and S12 of the first example embodiment.

In step S23, the extraction unit 210 determines whether the processing of steps S21 and S22 is repeated m times. When the processing of steps S21 and S22 is not repeated m times (S23: NO), the extraction unit 210 executes the processing of step S21 again. However, in this case, the extraction unit 210 extracts subgraph from a graph in which the subgraph extracted in the processing of step S21 executed one-step previously are assumed to be node. Note that w and k may be common in loop processing every time or may be different.

The graph in which the subgraph extracted in the processing of step S21 is assumed to be node will be described. Hereinafter, a graph (that is, source graph) input to the learning device 200 is referred to as "first graph", and a graph converted from the first graph is referred to as "second graph". The second graph assumes the subgraph included in the first graph to be one node, and a connection relationship between individual nodes (that is, subgraphs included in the first graph) is defined according to a distance between nodes. Similarly, subgraphs of a graph in m−1-th processing have been assumed to be one node, and a graph converted by using the node is referred to as "m-th graph".

For example, after the subgraphs of the first graph are extracted, and a distance between the extracted subgraphs is calculated, the extraction unit 210 extracts subgraphs from the second graph, that is, the graph in which the subgraphs of the first graph are assumed to be nodes. The extraction unit 210 continues processing such as extracting subgraphs from the first graph in the first loop processing of steps S21 and S22, and extracting subgraphs from the second graph in the second loop processing, and extracts subgraphs from an m-th graph in m-th loop processing. The extraction unit 210 executes the m times loop processing in this manner.

When the processing of steps S21 and S22 is repeated m times (S23: YES), the designing unit 230 executes processing of step S24, based on the m times processing. In step S24, the designing unit 230 designs the NN including m intermediate layers. Specifically, the designing unit 230 determines input of neuron in the m-th layer of the intermediate layers, based on a distance calculated in the m-th loop processing (detailed description of which will be given later).

Note that, in step S24, the designing unit 230 may add one or a plurality of layers to a layer subsequent to the m-th layer. A binding relationship between the m-th layer and the subsequent layer (m+1-th layer) may be predetermined or may be determined by a user input.

In step S25, the learning unit 240 executes learning processing by using the NN designed in step S24. For this learning processing, a general method in NN learning can be used. That is, the specific method in learning processing is not limited in particular.

Figure 7:
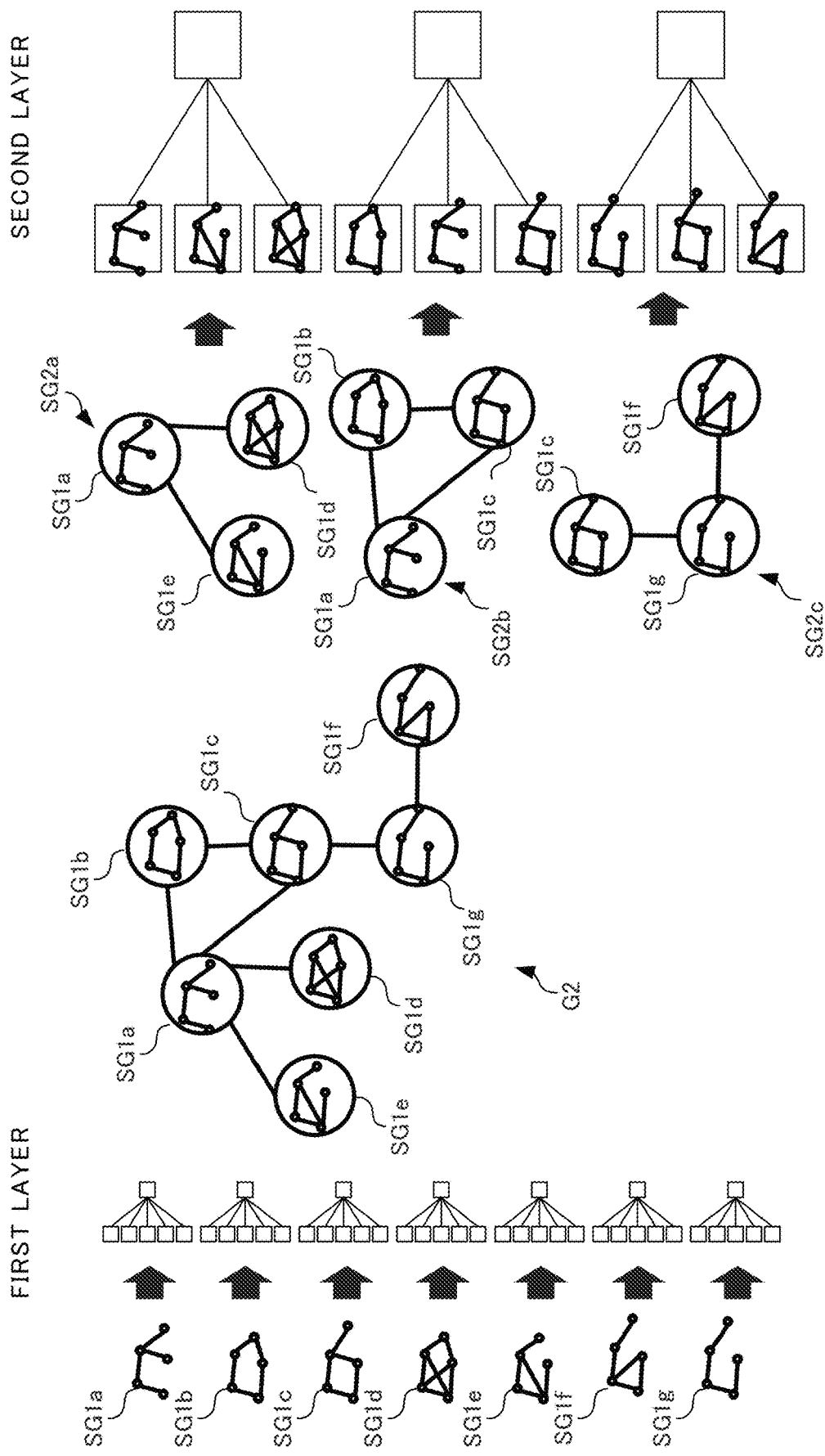
FIG. 7 is a diagram illustrating a specific example of an operation of the learning device.

FIG. 7 is a diagram illustrating a specific example of operation in the present example embodiment. In this example, subgraphs SG1$a$, SG1$b$, SG1$c$, SG1$d$, SG1$e$, SG1$f$, and SG1$g$ are subgraphs included in the first graph. Further, it is assumed that, in the first layer, w=7, k=5, and, in the second layer, w=3, k=3.

First, the extraction unit 210 extracts w (=7) subgraphs SG1$a$, SG1$b$, SG1$c$, SG1$d$, SG1$e$, SG1$f$, and SG1$g$ in which the number of nodes is k (=5), from the first graph. In this case, the designing unit 230 assumes nodes of these subgraphs to be input to neurons of the first layer. For example, in the first layer, seven neurons associating with each of subgraphs may be included. Note that the first graph may include a node that is not included in any of these subgraphs.

Further, the calculation unit 220 calculates a distance between these subgraphs. In FIG. 7, the subgraphs in an adjacent relationship are connected to each other by edge. For example, the subgraph SG1$a$ is adjacent to the subgraphs SG1$b$, SG1$c$, SG1$d$, and SG1$e$. Alternatively, the subgraph SG1$f$ is adjacent to only the subgraph SG1$g$. A graph G2 is related to the second graph in which these subgraphs are assumed to be a nodes, and the adjacent subgraphs are connected to each other by edges.

The extraction unit 210 extracts subgraphs SG2$a$, SG2$b$, and SG2$c$ from a graph G2. In more detail, the extraction unit 210 extracts subgraphs in which the number of nodes is k (=3), based on w (=3) nodes (in this example, subgraphs SG1$a$, SG1$b$, and SG1$g$) of high ranks, among the nodes configuring the graph G2 (that is, subgraphs SG1$a$ to SG1$g$.

The designing unit 230 assumes nodes of these subgraphs to be input to neurons of the second layer. For example, the second layer includes three neurons associating with each subgraph, and inputs to the first neuron of the second layer are the subgraphs SG1$a$, SG1$d$, and SG1$e$. Inputs to the second neuron of the second layer are the subgraphs SG1$a$, SG1$b$, and SG1$c$. Inputs to the third neuron of the second layer are the subgraphs SG1$c$, SG1$f$, and SG1$g$.

The learning device 200 can also execute the processing executed for the first graph, for the second graph. The learning device 200 executes extraction of subgraphs or calculation of a distance between the subgraphs, based on a third graph in which the subgraphs SG2$a$, SG2$b$, and SG2$c$ are assumed to be nodes.

As described above, according to the learning device 200 of the present example embodiment, it is possible to cause the NN to perform learning a graph structure. It is also possible for the NN to improve accuracy of output by learning. In the NN designed by the learning device 200 of the present example embodiment, inputs to neurons are determined based on associativity or similarity between subgraphs, thus it is possible to propagate a characteristic over multiple intermediate layers.

[Modifications]

The first and second example embodiments described above can apply the following modifications, for example. These modifications can be appropriately combined as required.

[Modification 1]

The distance between subgraphs may be determined according to elements other than the number of edges connecting two subgraphs. For example, when a weight is defined for edges, the calculation unit 120 may calculate, based on the weight of the edges connecting the two subgraphs, the distance between these subgraphs. When the two subgraphs are connected to each other by a plurality of edges, the calculation unit 120 may calculate the distance by adding or averaging the weight of these edges.

Further, based on the number of nodes shared in two subgraphs in an adjacent relationship, the calculation unit 120 may determine the distance between these subgraphs. In more detail, the calculation unit 120 may determine the distance so that the more the number of nodes are shared in the two subgraphs, these graphs are in a closer-in-distance relationship.

Figure 8:
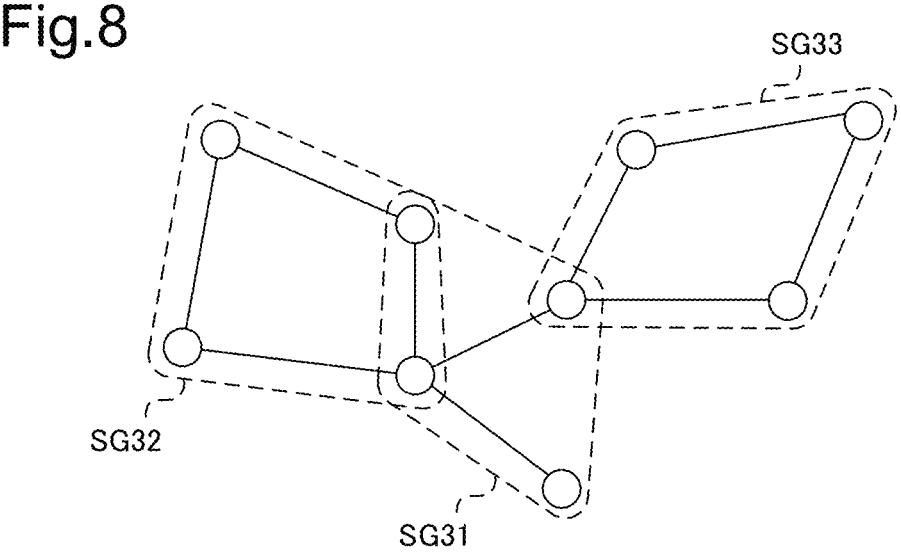
FIG. 8 is a diagram for describing one example of the method for calculating a distance.

FIG. 8 is a diagram for describing a method for calculating a distance according to the present example embodiment. In this example, a subgraph SG31 is in an adjacent relationship with subgraphs SG32 and SG33. The subgraph SG31 shares two nodes with the subgraph SG32, while the subgraph SG31 shares one node with the subgraph SG33.

In this case, the calculation unit 120 causes a distance between the subgraph SG31 and the subgraph SG32 shorter than a distance between the subgraph SG31 and the subgraph SG33. This is because the subgraphs in an adjacent relationship have stronger associativity or similarity as more nodes are shared.

[Modification 2]

A specific hardware configuration of the device according to the present disclosure may not be limited to a specific configuration. In the present disclosure, the configuration elements functionally described referring to the block diagram can be implemented by various hardware and software components, and are not always associated with a specific configuration. Further, the configuration elements described by one block in the present disclosure may be implemented in cooperation with a plurality of hardware components.

Figure 9:
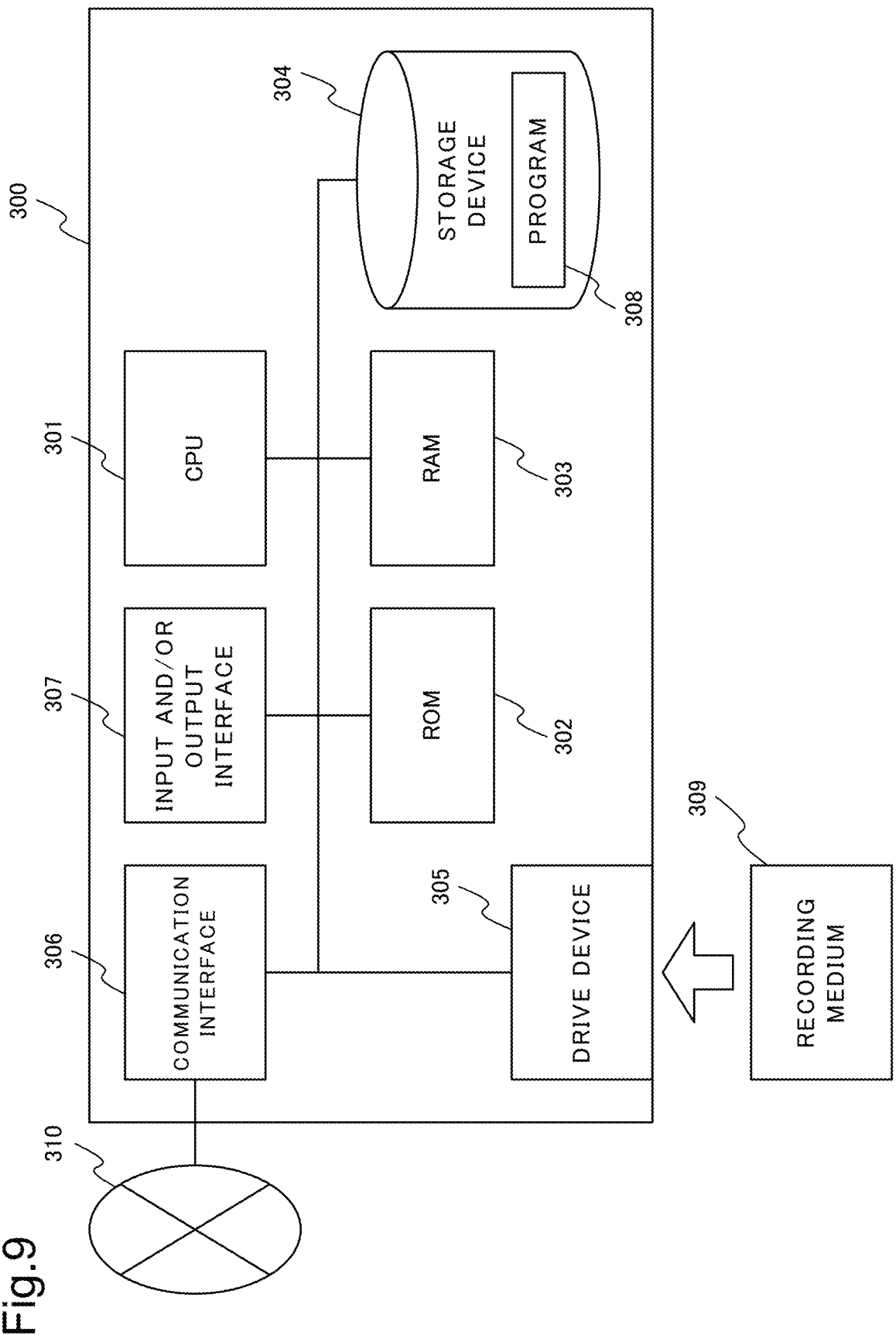
FIG. 9 is a block diagram illustrating one example of a hardware configuration of a computer device.

FIG. 9 is a block diagram illustrating one example of hardware configuration of a computer device 300 that implements the device according to the present disclosure. The computer device 300 is comprised of a central processing unit (CPU) 301, a read only memory (ROM) 302, a random access memory (RAM) 303, a storage device 304, a drive device 305, a communication interface 306, and an input and/or output interface 307.

The CPU 301 executes a program 308 by using the RAM 303. The program 308 may be stored in the ROM 302. Further, the program 308 may be recorded in a recording medium 309 such as memory card, and then read out by the drive unit 305, or may be transmitted from an external device via a network 310. The communication interface 306 exchanges data with the external device via the network 310. The input and/or output interface 307 exchanges data with peripheral (such as input device or display device). The communication interface 306 and the input and/or output interface 307 can function as the configuration elements for acquiring or outputting data.

The device according to the present disclosure can be implemented by the configuration (or a part thereof) illustrated in FIG. 9. For example, the CPU 301 can implement a function of extracting subgraphs (extraction units 110, 210), a function of calculating a distance between subgraphs (calculation units 120, 220), a function of designing NN (designing units 130, 230), and a function of causing NN to perform learning (learning unit 240), by using the RAM 303 as a temporary storage area.

Note that the configuration elements of the device according to the present disclosure may be composed of a single circuitry (such as processor), or may be composed of a combination of a plurality of circuitries. The circuitry mentioned herein may be dedicated or general-purpose. For example, part of the device according to the present disclosure may be implemented by a dedicated processor, and the other may be implemented by a general-purpose processor.

The configuration described as a single device in the example embodiments described above may be provided to be separated into a plurality of devices. For example, the information processing device 100 may be implemented in cooperation with a plurality of computer devices, by using a cloud computing technique and the like. Further, in the learning device 200, the extraction unit 210, the calculation unit 220, the designing unit 230, and the learning unit 240 may be composed of other devices. That is, a configuration for designing NN and a configuration for performing learning by using the designed NN are not inseparable.

Hereinabove, the present invention was described by way of typical example of the example embodiments and modifications described above. However, the present invention is not limited to these example embodiments and modifications. The present invention can include example embodiments applying various modifications or applications which so called those skilled in the art can understand, in the scope of the present invention. Further, the present invention can include example embodiments in which the descriptive matters set forth in the present description are appropriately combined or substituted as required. For example, the descriptive matters set forth by using a specific example embodiment can be applied to another example embodiment in the scope in which no contradiction occurs.

REFERENCE SIGNS LIST

100 Information processing device
200 Learning device
110, 210 Extraction unit
120, 220 Calculation unit
130, 230 Designing unit
240 Learning unit
300 Computer device

The invention claimed is:

1. An information processing device for neural network design and training, comprising:
a memory; and
at least one processor coupled to the memory,
the at least one processor configured to perform operations, the operations comprising:
   extracting a plurality of subgraphs from a graph, the graph comprising a plurality of nodes and a plurality of edges, each subgraph comprising at least one node from the graph;
   calculating a distance between at least a first subgraph and a second subgraph in the extracted plurality of subgraphs;
   designing a neural network to:
      input each subgraph of the extracted plurality of subgraphs into a respective neuron of a plurality of neurons in a predetermined layer of the neural network, and
      input the first subgraph and the second subgraph of the extracted plurality of subgraphs into a same neuron in a subsequent layer of the predetermined layer of the neural network based on a calculated distance between the first subgraph and the second subgraph being less than or equal to a threshold distance; and
   training the neural network based on sample data.

2. The information processing device according to claim 1,
wherein a second-level graph comprises:
   a plurality of second-level nodes each corresponding to a respective subgraph of the extracted plurality of subgraphs, and
   a plurality of second-level edges respectively connecting each pair of second-level nodes for which the calculated distance between subgraphs corresponding to each of the pair of second-level nodes is less than or equal to the threshold distance;
wherein the operations further comprises extracting a plurality of second-level subgraphs each comprising at least one second-level node from the second-level graph; and
wherein the neural network is further designed to input each of the extracted plurality of second-level subgraphs into a respective neuron of a plurality of neurons in the subsequent layer of the predetermined layer.

3. The information processing device according to claim 2, wherein first and second second-level subgraphs are input to a same neuron in the subsequent layer of the predetermined layer based at least in part on the first and second second-level subgraphs sharing at least one second-level node.

4. The information processing device according to claim 1, wherein the distance between two subgraphs is calculated based at least in part on a number of nodes are shared between the two subgraphs.

5. The information processing device according to claim 1, wherein the distance between two subgraphs is calculated based at least in part on a weight assigned to an edge connecting the two subgraphs.

6. The information processing device according to claim 1, wherein the extracting, calculating, and designing operations are recursively executed.

7. A neural network design and training method, comprising:
- extracting a plurality of subgraphs from a graph, the graph comprising a plurality of nodes and a plurality of edges, each subgraph comprising at least one node from the graph;
- calculating a distance at least a first subgraph and a second subgraph in between the extracted plurality of subgraphs;
- designing a neural network to:
  - input each subgraph of the extracted plurality of subgraphs into a respective neuron of a plurality of neurons in a predetermined layer of the neural network, and
  - input the first subgraph and the second subgraph of the extracted plurality of subgraphs into a same neuron in a subsequent layer of the predetermined layer of the neural network based on a calculated distance between the first subgraph and the second subgraph being less than or equal to a threshold distance; and
- training the neural network based on sample data.

8. A non-transitory computer-readable recording medium embodying a program for causing a computer processor to perform a method, the method comprising:
- extracting a plurality of subgraphs from a graph, the graph comprising a plurality of nodes and a plurality of edges, each subgraph comprising at least one node from the graph;
- calculating a distance between at least a first subgraph and a second subgraph in the extracted plurality of subgraphs;
- designing a neural network to:
  - input each subgraph of the extracted plurality of subgraphs into a respective neuron of a plurality of neurons in a predetermined layer of the neural network, and
  - input the first subgraph and the second subgraph of the extracted plurality of subgraphs into a same neuron in a subsequent layer of the predetermined layer of the neural network based on a calculated distance between the first subgraph and the second subgraph being less than or equal to a threshold distance; and
- training the neural network based on sample data.

* * * * *